United States Patent
Hayashi et al.

(10) Patent No.: US 8,806,867 B2
(45) Date of Patent: Aug. 19, 2014

(54) VARIABLE GEOMETRY EXHAUST TURBOCHARGER

(75) Inventors: Noriyuki Hayashi, Sagamihara (JP); Yasuaki Jinnai, Sagamihara (JP); Masaki Tojo, Sagamihara (JP); Yoichi Ueno, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 404 days.

(21) Appl. No.: 13/146,030

(22) PCT Filed: Sep. 15, 2009

(86) PCT No.: PCT/JP2009/066101
§ 371 (c)(1),
(2), (4) Date: Aug. 18, 2011

(87) PCT Pub. No.: WO2010/097980
PCT Pub. Date: Sep. 2, 2010

(65) Prior Publication Data
US 2011/0296829 A1  Dec. 8, 2011

(30) Foreign Application Priority Data
Feb. 26, 2009  (JP) .................................. 2009-044722

(51) Int. Cl.
*F02D 23/00*  (2006.01)
*F02B 37/24*  (2006.01)
*F01D 17/16*  (2006.01)

(52) U.S. Cl.
CPC .............. *F02B 37/24* (2013.01); *F01D 17/167* (2013.01)
USPC .............................. 60/602; 415/160; 415/164

(58) Field of Classification Search
CPC ........ F02B 37/00; F02B 37/24; F01D 17/165; F02C 6/12; F05D 2220/40; F05D 2260/94; F05D 2300/501; F05D 2300/50212; Y02T 10/144
USPC ..................................... 60/602; 415/159–164
See application file for complete search history.

(56) References Cited

U.S. PATENT DOCUMENTS 2,860,827 A  11/1958  Egli
6,558,117 B1  5/2003  Fukaya et al.
(Continued)

FOREIGN PATENT DOCUMENTS

EP  1234950 A1  8/2002
EP  1965039 A2  9/2008
(Continued)

OTHER PUBLICATIONS

Chinese Notice of Allowance, dated Jun. 6, 2013, for Chinese Application No. 200980157151.5 with an English translation.

(Continued)

*Primary Examiner* — Thai Ba Trieu
(74) *Attorney, Agent, or Firm* — Birch, Stewart, Kolasch & Birch, LLP

(57) ABSTRACT

A variable geometry exhaust turbocharger, wherein bolts which fasten a variable nozzle mechanism do not loosen. A variable geometry exhaust turbocharger, is provided with a turbine housing a turbine rotor, a turbine shaft a bearing for supporting the turbine shaft, a bearing housing, and a variable nozzle mechanism for regulating the flow of exhaust gas. The variable nozzle mechanism is provided with a nozzle, a nozzle mount, a lever plate, and a drive ring. A nozzle plate with which the tip of the nozzle makes contact is provided to an inner tube section of the turbine housing. A sleeve member is provided between the nozzle mount and the nozzle plate so as to be coaxial with a through-hole and a screw-through hole. The nozzle mount and the nozzle plate are connected together by fastening bolts passed through the through-hole, the sleeve member, and the screw through-hole, in that order.

15 Claims, 6 Drawing Sheets

(56) References Cited

U.S. PATENT DOCUMENTS

| | | | |
|---|---|---|---|
| 7,322,791 B2* | 1/2008 | Stilgenbauer | 60/602 |
| 2002/0119042 A1 | 8/2002 | Yoshimura et al. | |
| 2004/0081567 A1 | 4/2004 | Boening | |
| 2005/0169748 A1* | 8/2005 | Metz et al. | 415/160 |
| 2005/0252210 A1 | 11/2005 | Shiraishi et al. | |
| 2006/0188368 A1 | 8/2006 | Jinnai et al. | |
| 2008/0193281 A1 | 8/2008 | Sausse et al. | |
| 2008/0223956 A1 | 9/2008 | Jinnai et al. | |
| 2008/0260520 A1 | 10/2008 | Hettinger et al. | |
| 2009/0151348 A1 | 6/2009 | Hayashi et al. | |

FOREIGN PATENT DOCUMENTS

| | | |
|---|---|---|
| JP | 62-154240 U | 9/1987 |
| JP | 8-177509 A | 7/1996 |
| JP | 11-336554 A | 12/1999 |
| JP | 2001-289050 A | 10/2001 |
| JP | 2004-132367 A | 4/2004 |
| JP | 2006-514191 A | 4/2006 |
| JP | 2006-220053 A | 8/2006 |
| JP | 2006-527323 A | 11/2006 |
| JP | 2008-128065 A | 6/2008 |
| JP | 2008-169788 A | 7/2008 |
| JP | 2008-215083 A | 9/2008 |
| KR | 10-2006-0015996 A | 2/2006 |
| WO | 2007/046798 A1 | 4/2007 |
| WO | 2008/098024 A2 | 8/2008 |

OTHER PUBLICATIONS

Korean Notice of Allowance, dated Jun. 4, 2013, for Korean Application No. 10-2011-7019601 with a partial English translation.

* cited by examiner

VARIABLE GEOMETRY EXHAUST TURBOCHARGER

BACKGROUND OF THE INVENTION

1. Field of the Invention

The present invention relates to a variable geometry exhaust turbocharger configured such that the angle of nozzle vanes can be changed.

2. Description of the Related Art

Conventionally, in a relatively small-sized turbocharger which is used for a vehicle internal combustion engine or the link, exhaust gas from the engine fills a scroll formed in a turbine housing, is fed through a plurality of nozzle vanes arranged on an inner peripheral side of the scroll, and is then applied to a turbine rotor arranged on the inner peripheral side of the nozzle vanes. And a variable nozzle mechanism which is capable of changing the blade angle of the plurality of nozzle vanes, is used. A variable geometry exhaust turbocharger of radial flow type which is equipped with the variable nozzle mechanism has been often used. For example, this type of the variable nozzle mechanism is illustrated in Patent Documents 1 to 3.

FIG. 5 shows a conventional example of the exhaust turbocharger incorporating the abovementioned variable nozzle mechanism. This figure is a sectional view taken along the rotating axis thereof. FIG. 5 shows a turbocharger having a turbine housing 1 which has a thick multi-cylindrical shape. A scroll 2 is formed in a spiral-like configuration on the outer peripheral side of the turbine casing 1. On the inner peripheral side of the turbine housing, a turbine rotor 3 of a radial flow type is provided. The turbine rotor 3 is mounted on a turbine shaft 3A which has a rotation axis K and is arranged coaxially with a compressor. The turbine shaft 3A is rotatably supported in a bearing housing 4 via a bearing 5.

A concave portion of an annular shape is formed on a rear face of the bearing housing 4. In the concave portion, housed is a variable nozzle mechanism 8 having a nozzle 6, a nozzle mount 7 and so on. Herein, a plurality of nozzles 6 is provided around the rotation axis K at equal intervals. Further, the nozzles 6 are located on the inner peripheral side of the scroll 2 in the radial direction of the turbine. Each of the nozzles 6 comprises a nozzle vane 6a and a nozzle shaft 6b. The nozzle shaft 6b is rotatably supported in the nozzle mount 7 secured to the bearing housing 4. And the blade angle of the nozzle vanes can be changed by the variable nozzle mechanism 8.

The nozzle vanes 6a are arranged between the nozzle mount 7 and an annular nozzle plate 9 which is coupled to the nozzle mount 7. The nozzle plate 9 is attached to a tip portion of an inner cylindrical portion of the turbine housing 1.

The nozzle mount has an elevated portion on a front face thereof. On the elevated portion, a drive ring 10 which is formed in a disc-like shape is rotatably supported. A lever plate 11 is engaged with the drive ring 10. The lever plate 11, whose enlarged view is shown in FIG. 6, comprises a bent portion 11a and a protruding portion 11b for engagement. The protruding portion 11b for engagement is engaged in a groove 10a of the drive ring 10.

Further, the lever plate 11 has through-holes formed along the rotation axis K on the inner peripheral side of the lever plate. A fixed part 6c formed on the tip side of the nozzle shaft 6b is inserted in the through-hole.

FIG. 7 is shows an elevation from the direction A of FIG. 6. As shown in the figure, the drive ring 10 is arranged closer to the center of the radial direction on the disk-shaped nozzle mount 7. On the drive ring 10, the lever plates 11 are connected. The fixed parts 6c of the nozzles 6 are engaged in the lever plate 11 on the rotation shaft K side thereof. The figure shows twelve lever plates provided around the rotation shaft K. The opening of the nozzles 6 are adjusted by rotating the drive ring 10.

During the operation of the variable geometry type exhaust turbocharger incorporating the variable nozzle mechanism having the configuration explained through FIG. 5 to FIG. 7, exhaust gas from an engine (not shown in the drawings) is led into the scroll 2 so as to be swirled along spiral passages in the scroll 2, and is then introduced through the nozzle vanes 6a. Then the exhaust gas flows through the gaps between the vanes and then flows onto the turbine rotor 3 from the outer periphery of the turbine rotor 3. Thereafter, the exhaust gas flows radially toward the center of the turbine rotor 3 so as to carry out the expansion to the turbine rotor 3. Then, the exhaust gas flows along the axial direction, and is led to a gas outlet from which the exhaust gas is discharged to outside of the turbocharger.

To control the delivery volume of the above-mentioned variable geometry type exhaust turbocharger, the blade angle of the nozzle vanes 6a is set by an blade angle controller (which is not shown) so as to regulate the flow rate of the exhaust gas passing through the nozzle vanes 6a to a desired rate. The reciprocal displacement of the actuator in response to the thus set blade angle is transmitted to the drive ring 10 so as to rotate the drive ring 10.

The rotation of the drive ring 10 causes the lever plates 11 to rotate around the nozzle shaft 6b via the protruding portions 11b which are engaged in the grooves 10a formed in the drive ring 10. The rotation of the nozzle shafts 6b causes the nozzle vanes 6a to rotate so as to change the blade angle of the nozzle vanes 6a.

PATENT DOCUMENT

[Patent Document 1] JP2008-128065A
[Patent Document 2] JP2008-215083A
[Patent Document 3] U.S. Pat. No. 2,860,827

SUMMARY OF THE INVENTION

Object to be Solved

However, the conventional variable geometry type exhaust turbocharger illustrated in FIG. 5 through FIG. 7, the variable nozzle mechanism is subjected to high temperature, thereby causing thermal deformation to inner parts of the variable nozzle mechanism. This may cause a compression deformation of a sleeve member 12, cause a contact area between the sleeve member and the nozzle plate 9 or the nozzle mount 7 to sink in, and cause the nozzle plate 9 to warp. This can reduce the space between the nozzle vane 6a and the nozzle mount 7 or the nozzle plate 9. When the space becomes excessively small, the nozzle vane 6a may experience a malfunction. Further, fastening bolts B shown in FIG. 5 are provided in a space surrounded by the turbine housing 1 and the bearing housing 4, and thus the fastening bolts B reaches a high temperature, which may cause the bolts to thermally expand or get loose by the engine vibration.

In view of the above problems inherent to the prior art, an object of the present invention is to prove a variable geometry exhaust turbocharger in which an operation failure due to a deformation of inner parts of a variable nozzle mechanism does not occur and bolts for fastening the variable nozzle mechanism do not get loose.

Means to Solve the Problems

The present invention was made to solve the above problems.

The present invention provides a variable geometry exhaust turbocharger, comprising: a turbine housing to which exhaust gas from an internal combustion engine is introduced; a turbine rotor which is arranged in the turbine housing and is rotated by the exhaust gas; a turbine shaft whose one end is inserted in the turbine housing and is attached to the turbine rotor; a bearing which supports the turbine shaft; a bearing housing which is connected to the turbine housing and houses the bearing; and a variable nozzle mechanism which is fixed to the bearing housing and adjusts a flow of the exhaust gas to the turbine rotor, wherein the variable nozzle mechanism includes a nozzle, a nozzle mount which supports the nozzle, a lever plate which engages with the nozzle and a drive ring which engages with the lever plate, the turbine housing is a double cylindrical structure having an inner cylindrical portion and an outer cylindrical portion, a nozzle plate of an annular shape which comes in contact with a tip of the nozzle is provided in the inner cylindrical portion of the turbine housing, a through-hole and a screw through-hole are respectively provided in the nozzle mount and the nozzle plate, a sleeve member is arranged coaxially with the through-hole and the screw through-hole between the nozzle mount and the nozzle plate, the nozzle mount and the nozzle plate are connected by a fastening bolt which is inserted in the through-hole, the sleeve member and the screw through-hole in this order, and the sleeve member is formed such that a portion which is in contact with the nozzle mount and the nozzle plate has a thickness greater than that of a middle portion.

According to the present invention, the area of the end portion of the sleeve member that is in contact with the nozzle mount 7 and the nozzle plate 9 becomes larger and thus, the pressure on the contact surface per unit area is reduced and the deformation of the contact surface such as depression can be prevented. Further, the depression of the contact surface may lead to reducing the space between the end surfaces of the nozzle, which could result in the nozzle being stuck there. Furthermore, the middle portion of the sleeve member is exposed to a gas passage and has a thickness that is smaller than that of the end portion of the sleeve member and thus, the flow turbulence of the exhaust gas can be suppressed and the performance degradation of the turbine can be prevented.

In the present invention, it is preferable that the sleeve member is formed into a flange shape at each end portion thereof such that said each end portion of the sleeve member becomes thinner toward an outer circumference of the end portion.

By this, the outer circumferential side of the flange has higher elasticity and thus, the distribution of the pressure between the sleeve member 12 and each of the nozzle mount 7 and the nozzle plate becomes closer to even. As a result, it is possible to prevent strong impact near the outer circumference edge of the flange and plastic deformation thereof due to the impact.

It is also preferable, according to the present invention, that the sleeve member is made of a material which has a lower rigidity than the nozzle mount, the nozzle plate and the fastening bolt.

By this, the sleeve member deforms before the nozzle mount and the nozzle plate, which leads to reduction of the contact pressure between the sleeve member and each of the nozzle mount and the nozzle plate. As a result, it is possible to further suppressing reduction of the space between the sleeve member and nozzle end surface of the nozzle mount and the nozzle plate.

It is also preferable in the variable geometry exhaust turbocharger of the present invention that the sleeve member is made of a material which has a lower coefficient of linear thermal expansion than the fastening bolt.

In this manner, the temperature of the sleeve member being directly exposed to the exhaust gas becomes higher than that of the fastening bolt B and thus, the thermal expansion of the sleeve member becomes great and the contact pressure between the sleeve member and each of the nozzle mount 7 and the nozzle plate 9 tends to become high. Therefore, the sleeve member is made of a material with a lower coefficient of linear thermal expansion so as to prevent the contact pressure from becoming high. As a result, it is possible to suppress the reduction of the space of the end surfaces of the nozzle due to the plastic deformation of the contact surface.

It is also preferable that the fastening bolt has a tip which protrudes through a surface of the nozzle plate, the tip of the fastening bolt being swaged.

According to the present invention, the fastening bolt is screwed in the screw through-hole of the nozzle plate and thus, it is possible to prevent the excessive vibration of the nozzle plate due to loosening of the fastening bolt. Further, it is possible to reduce the risk of damaging parts for fastening the nozzle mount and the nozzle plate. Furthermore, the tip of the fastening bolt is swaged so as to firmly prevent loosening of the fastening bolt for fastening the variable nozzle mechanism.

It is further preferable that the nozzle plate has a rib formed on a surface of the nozzle plate on a downstream side of the turbocharger.

According to the present invention, the rib is formed on the surface of the nozzle plate so as to suppress the thermal deformation of the nozzle plate during the operation and also to suppress the reduction of the space at the nozzle end surface. Further, when there is external force of vibration having high frequency such as the engine, it is possible to reduce the dynamic load on the fastening bolt B which fastens the nozzle mount and the nozzle plate, thereby improving the reliability of the fastening bolt against the breakage.

It is also preferable in the present invention that the rib of the nozzle plate is formed along at least one of a circumferential direction of the nozzle plate and a radial direction of nozzle plate.

According to the present invention, the deformation of the nozzle plate in the circumferential direction thereof can be equalized and suppressed by the rib formed in the circumferential direction while the curvatura of the nozzle plate in the radial direction can be prevented by the rib formed in the radial direction.

Effect of the Present Invention

In the variable geometry exhaust turbocharger of the present invention, there occurs no failure due to the deformation of the parts in the variable nozzle mechanism. Further, the fastening bolt for fastening the variable nozzle mechanism is safe from being loose or damaged.

BRIEF DESCRIPTION OF THE DRAWINGS

[FIG. 1] An explanatory drawing showing a first preferred embodiment of a variable geometry exhaust turbocharger in relation to the present invention.

[FIG. 4] An explanatory drawing showing a rib formed on a nozzle plate.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

[First Preferred Embodiment]

Figures 1A, 1B:
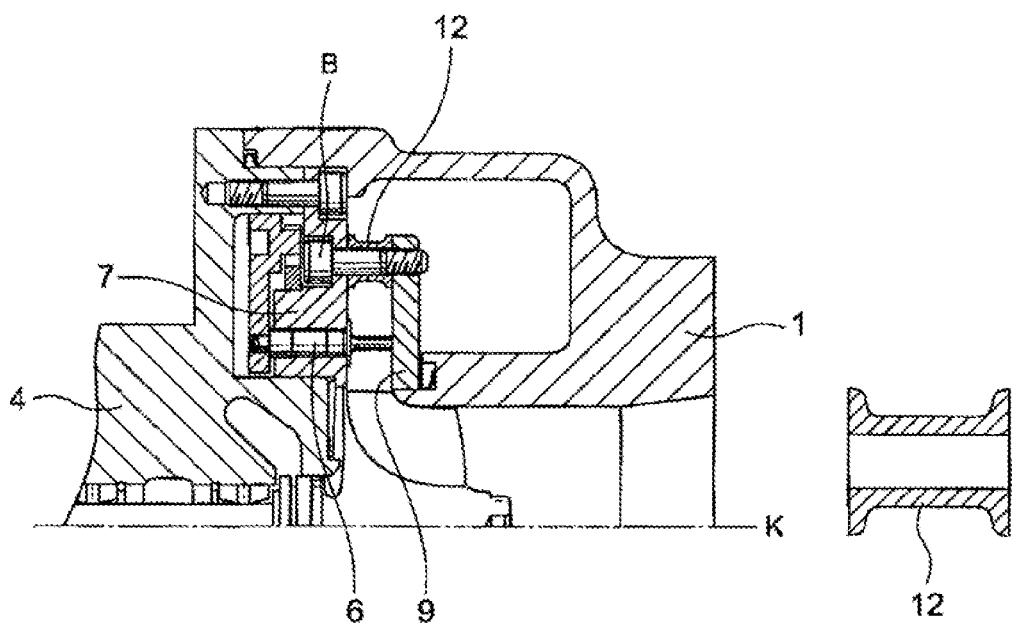
FIG. 1(A) is a sectional view of a relevant part of the variable geometry exhaust turbocharger and FIG. 1(B) is an enlarged view of a sleeve member.

FIG. 1 is an explanatory drawing showing a first preferred embodiment of a variable geometry exhaust turbocharger in relation to the present invention. FIG. 1 is a sectional view along a rotation shaft center K. As shown in the drawing, a turbocharger has a turbine housing 1 which is shaped into a multi-layered cylinder and into which exhaust gas of an internal combustion engine is introduced. A scroll 2 of a spiral shape is formed in an outer circumferential part of the turbine housing 1 on an upstream side thereof. A turbine rotor 3 of a radial flow type is formed in an inner circumferential part of the turbine housing 1 on the upstream side thereof. The turbine rotor 3 is rotated by the exhaust gas. The turbine rotor 3 is arranged on one end of a turbine shaft 3A. The end of the turbine shaft 3A is inserted into the turbine housing 1. The turbine shaft 3A has a rotation center that is the rotation shaft center K and is coaxially arranged with a compressor (not shown in the drawing). Further, the turbine shaft 3A is supported rotatably in a bearing housing 4 via a bearing 5.

The bearing housing 4 has a depression of a ring shape formed on a rear side thereof. In the depression, arranged is a variable nozzle mechanism 8 as a nozzle assembly which comprises a nozzle 6, a nozzle mount 7 supporting the nozzle 6, a nozzle plate 9, a drive ring 10 and a lever plate 11 engaging with the nozzle 6, the drive ring 10 and so on. The variable nozzle mechanism 8 is fixed to the bearing housing 4 and adjusts the flow of the exhaust gas.

A plurality of nozzles 6 are equally spaced around the rotation shaft center K. Further, the nozzles 6 are disposed on an inner side of the scroll 2 in a radial direction of the turbocharger. The nozzles 6 comprise nozzle vanes 6a and nozzle shafts 6b respectively. The nozzle shafts 6b are supported rotatably on the nozzle mount 7 fixed to the bearing housing 4. By this, the variable nozzle mechanism 8 can change a vane angle of the nozzle vanes 6a.

The nozzle vanes 6a are disposed between the nozzle mount 7 and the nozzle plate 9 coupled to the nozzle mount 7. The nozzle plate 9 is fit at the outside of an inner cylindrical part of the turbine housing 1.

The drive ring 10 is arranged rotatably at a tuberal part on a tip of the nozzle mount 7. The drive ring 10 engages with the lever plate 11.

Further, the lever plate 11 has through-holes formed along the rotation shaft center k on an inner circumferential side of the lever plate 11. In each of the through-holes, a fixing member 6c formed on a tip side of the nozzle shaft 6b is inserted.

During the operation of the variable geometry exhaust turbocharger equipped with the variable nozzle mechanism having the above structure, the exhaust gas is introduced to the scroll from the engine (not shown in the drawing) and then into the nozzle vanes 6a while streaming along a spiral passage of the scroll 2. Then, the exhaust gas flows through the gap between the nozzle vanes 6a into the turbine rotor 3 from an outer circumferential side, streams radially toward the center while working expansion to the turbine rotor 3 and then guided to a gas discharge port to be discharged outside of the turbocharger.

To control the geometry of the variable geometry exhaust turbocharger, an angle of the nozzle vanes 6a is set so that the exhaust gas streams through the nozzle vanes 6a at a prescribed speed and the angle of the nozzle vanes is changed by a vane angle controller (not shown in the drawing). The reciprocation displacement of the actuator in response to the vane angle is transmitted to the drive ring 10 so as to rotate the drive ring 10.

By the rotation of the drive ring 10, the lever plate 11 which engages with the drive ring 10 is rotated around the nozzle shaft 6b and then the rotation of the nozzle shafts 6b rotates the nozzle vanes 6a. In this manner, the vane angle is changed.

In the preferred embodiment, the turbine housing 1 is a double cylindrical structure having an inner cylindrical portion 1a and an outer cylindrical portion 1b. A nozzle plate 9 of an annular shape which comes in contact with a tip of the nozzle 6 is provided in the inner cylindrical portion 1a of the turbine housing 1. A through-hole 7a and a screw through-hole 9a are respectively provided in the nozzle mount 7 and the nozzle plate 9. The screw through-hole is formed such that a fastening bolt can be fastened through the screw through-hole. A sleeve member 12 is arranged coaxially with the through-hole 7a and the screw through-hole 9a between the nozzle mount 7 and the nozzle plate 9. The nozzle mount 7 and the nozzle plate 9 are connected by a fastening bolt B which is inserted in the through-hole 7a, the sleeve member 12 and the screw through-hole 9a in this order, and the sleeve member 12 is formed such that a portion which is in contact with the nozzle mount 7 and the nozzle plate 9 in a radial direction has a thickness greater than that of a middle portion. By this, the area of the end portion of the sleeve member 12 that is in contact with the nozzle mount 7 and the nozzle plate 9 becomes larger and thus, the pressure on the contact surface per unit area is reduced and the deformation of the contact surface such as depression can be prevented. Further, the depression of the contact surface may lead to reducing the space between the end surfaces of the nozzle, which could result in the nozzle being stuck there. Furthermore, the middle portion of the sleeve that is exposed to a gas passage is comparatively small and thus, the flow turbulence of the exhaust gas can be suppressed and the performance degradation of the turbine can be prevented.

In the preferred embodiment, the sleeve member 12 is formed into a flange shape at each end portion thereof such that said each end portion of the sleeve member becomes thinner toward an outer circumference of the end portion. That is, the outer circumferential side of the flange has higher elasticity and thus, the distribution of the pressure between the sleeve member 12 and each of the nozzle mount 7 and the nozzle plate becomes closer to even. As a result, it is possible to prevent strong impact near the outer circumference edge of the flange and plastic deformation thereof due to the impact.

It is preferable that the sleeve member 12 is made of a material which has a lower rigidity than the nozzle mount 7, the nozzle plate and the fastening bolt B. With this configuration, the sleeve member 12 deforms before the nozzle mount 7 and the nozzle plate 7, which leads to reduction of the contact pressure between the sleeve member 12 and each of the nozzle mount 7 and the nozzle plate 8. As a result, it is possible to further suppressing reduction in the space between the end surfaces of the nozzle and the nozzle plate surface.

More specifically, as a material selection of the fastening bolt B and the sleeve member 12, the fastening bolt B may be Ni-based heat-resistant alloy or precipitation-hardening heat-resistant steel and the sleeve member 12 may be austenite stainless steel.

It is also preferable that the sleeve member 12 is made of a material which has a lower coefficient of linear thermal expansion than the fastening bolt B. During the operation of the turbocharger, the temperature of the sleeve member being directly exposed to the exhaust gas becomes higher than that of the fastening bolt B and thus, the sleeve member 12 thermally expands and the contact pressure between the sleeve member and each of the nozzle mount 7 and the nozzle plate 9 easily gets high. Therefore, the sleeve member 12 is made of a material with a lower coefficient of linear thermal expansion so as to prevent the contact pressure from becoming high. As a result, it is possible to suppress the reduction of the space of the end surfaces of the nozzle due to the plastic deformation of the contact surface.

As a material selection of the fastening bolt B and the sleeve member 12, for instance, the fastening bolt B may be austenite stainless steel and the sleeve member 12 may be ferritic stainless steel. Alternatively, in consideration of the difference of the coefficient of linear thermal expansion, stainless steels can be used for the fastening bolt B and the sleeve member 12.

[Second Preferred Embodiment]

Figure 2:
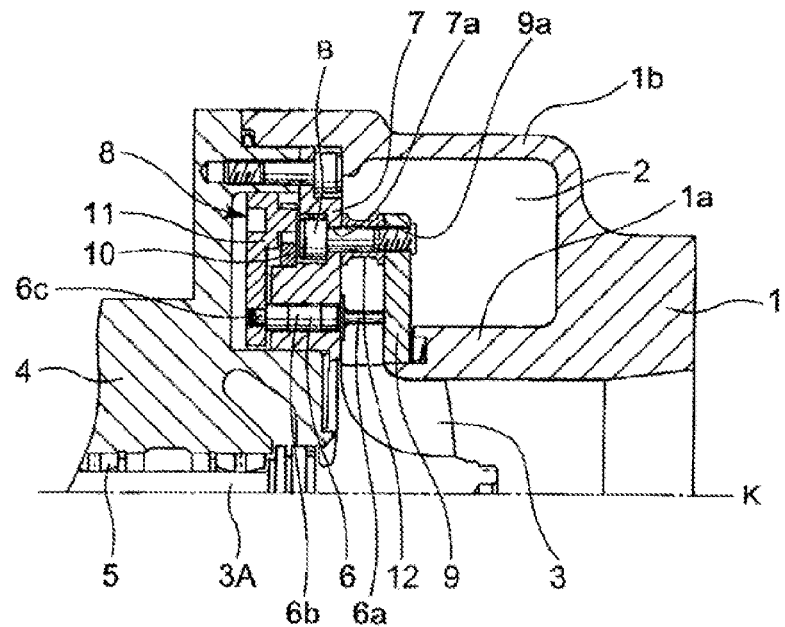
[FIG. 2] An explanatory drawing showing a second preferred embodiment of the variable geometry exhaust turbocharger in relation to the present invention.

FIG. 2 illustrates a second preferred embodiment of the variable geometry exhaust turbocharger of the present invention. In the second preferred embodiment, the same reference numbers are used for the same parts as the first preferred embodiment, that will not be explained further.

In the second preferred embodiment, the fastening bolt B has a tip which protrudes through a surface of the nozzle plate 9 and the tip of the fastening bolt B is swaged.

In this configuration, the fastening bolt B is screwed in the screw through-hole 9a of the nozzle plate 9 and thus, it is possible to prevent the excessive vibration of the nozzle plate 9 due to loosening of the fastening bolt. Further, it is possible to reduce the risk of damaging parts for fastening the nozzle mount 7 and the nozzle plate 9. Furthermore, the tip of the fastening bolt B is swaged so as to firmly prevent loosening of the fastening bolt B which fastens the variable nozzle mechanism 8.

It is effective to use this method with the first preferred embodiment so as to prevent the deformation of the sleeve member 12 and the contact surface of the nozzle plate 9 or the nozzle mount 7 due to the load generated when the fastening bolt B is swaged.

[Third Preferred Embodiment]

Figure 3:
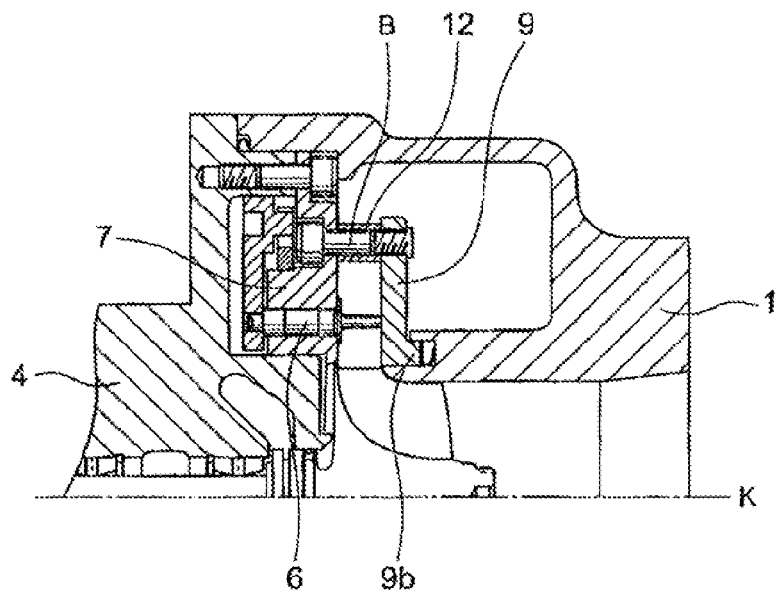
[FIG. 3] An explanatory drawing showing a third preferred embodiment of the variable geometry exhaust turbocharger in relation to the present invention.

FIG. 3 illustrates a third preferred embodiment of the variable geometry exhaust turbocharger of the present invention. In the third preferred embodiment, the parts that are already described in the first preferred embodiment use the same reference numbers and will not be explained further here.

Figure 4A:
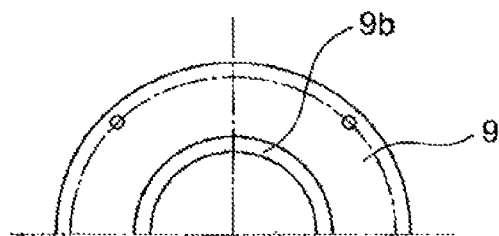
FIG. 4(a) shows a nozzle plate having a rib formed in a circumferential direction thereof.
Figure 4B:
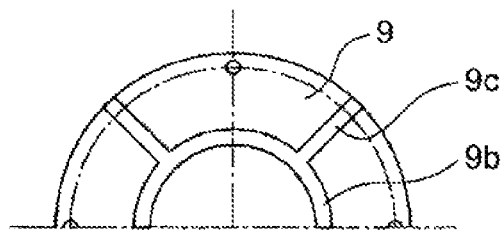
FIG. 4(b) shows a nozzle plate having a rib formed in both a circumferential direction and a radial direction thereof.
Figure 4C:
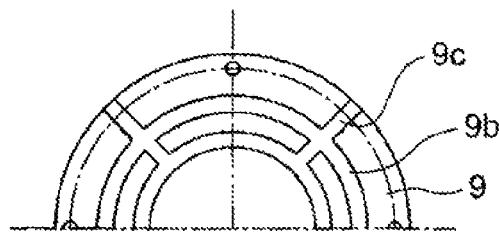
FIG. 4(c) shows a nozzle plate having another rib formed in a circumferential direction thereof in addition to those illustrated in FIG. 4(b).
Figure 5:
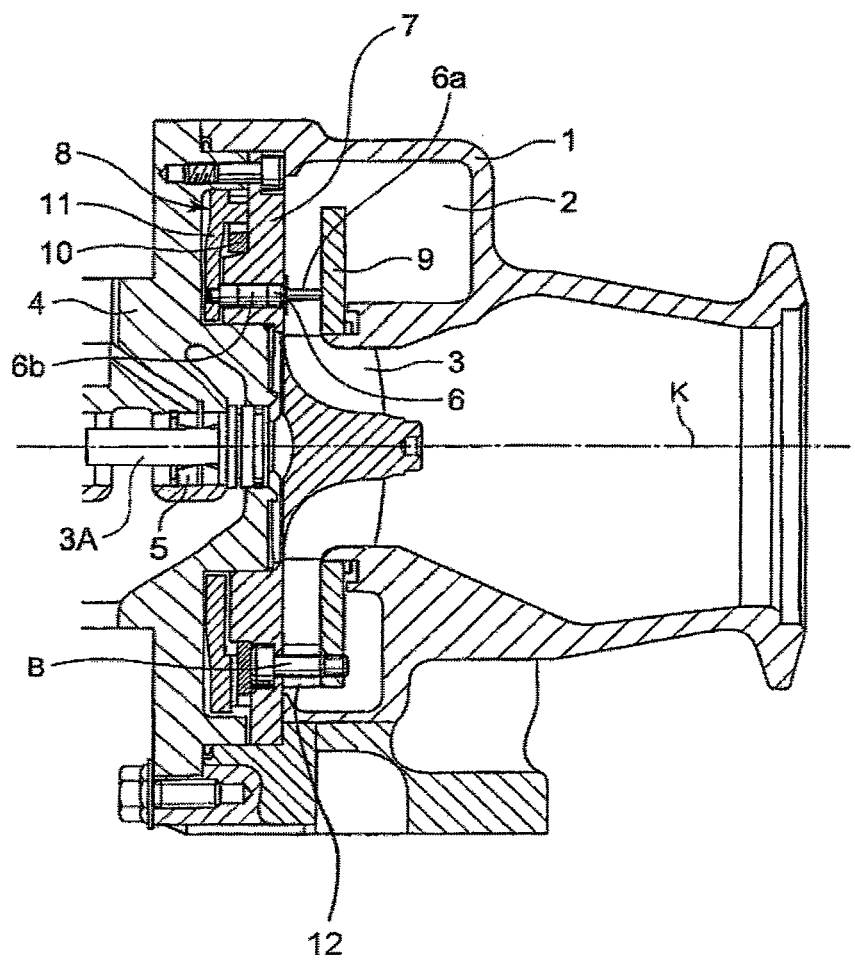
[FIG. 5] An explanatory drawing showing a conventional variable geometry exhaust turbocharger.
Figure 6:
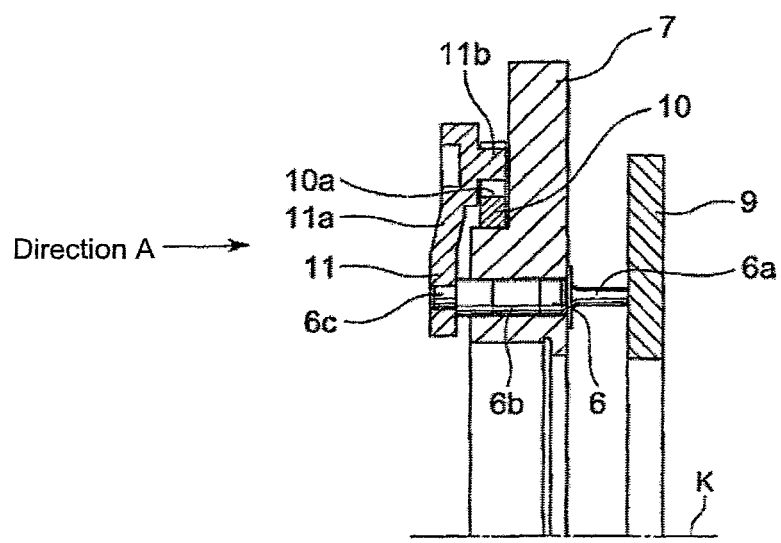
[FIG. 6] An enlarged view near a nozzle mount of FIG. 5.
Figure 7:
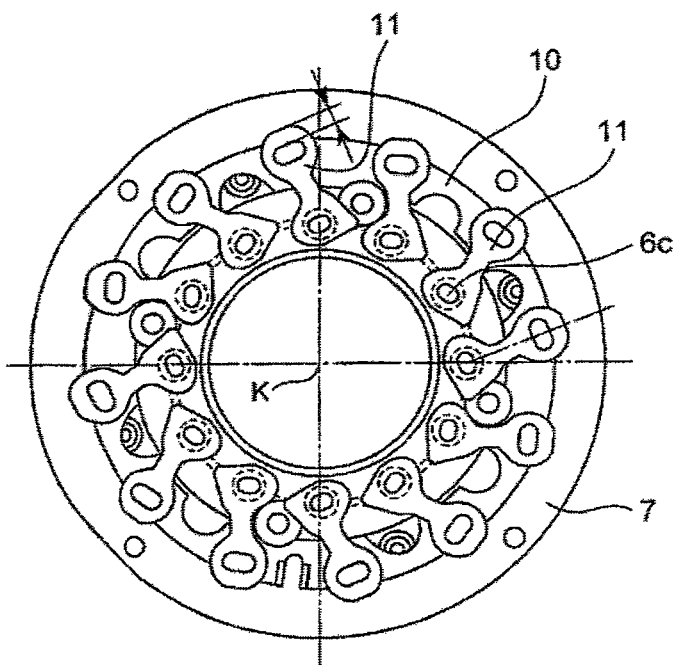
[FIG. 7] A perspective view taken from a direction A of FIG. 6.

In the third preferred embodiment, the nozzle plate 9 has a rib 9b formed on a surface of the nozzle plate 9 on a downstream side of the turbocharger. More specifically, the rib 9b of an annular shape is formed on an inner circumferential edge of the disk-shaped nozzle plate 9 as illustrated in FIG. 4(*a*). The rib 9b is integrally formed with the nozzle plate 9 as a part of the nozzle plate 9 but it is also possible to make the rib 9b separately and mount the rib 9b on the nozzle plate 9b.

In comparison to such a case that the nozzle plate is made thicker instead of providing the rib 9b, the nozzle plate 9 can be made lighter.

According to the preferred embodiment, the rib 9b is formed on the surface of the nozzle plate 9 so as to suppress the thermal deformation of the nozzle plate during the operation and also to suppress the reduction of the space at the nozzle end surface. Further, when there is external force of vibration having high frequency such as the engine, it is possible to reduce the dynamic load on the fastening bolt B which fastens the nozzle mount 7 and the nozzle plate 9, thereby improving the reliability of the fastening bolt B against the breakage.

The third preferred embodiment describes the example in which the rib 9b is formed on the nozzle plate in the circumferential direction thereof. However, a forming method and arrangement of the rib 9b is not limited thereto. For instance, the ribs 9b and 9c can be formed along the circumferential direction and the radial direction of the nozzle plate 9. In this manner, the deformation of the nozzle plate in the circumferential direction thereof can be equalized and suppressed by the rib 9b formed in the circumferential direction while the curvatura of the nozzle plate in the radial direction can be prevented by the rib 9b formed in the radial direction.

Further, it is possible to form more than one rib 9b in the circumferential direction in a concentric manner as illustrated in FIG. 4(*c*). As a result, the strength of the nozzle plate can be enhanced.

While the present invention has been described with reference to exemplary embodiments, it is to be understood that the invention is not limited to the disclosed exemplary embodiments and that modifications and variations are possible within the scope of the present invention.

Industrial Applicabilities

In the variable geometry exhaust turbocharger of the present invention, there occurs no failure due to the deformation of the parts in the variable nozzle mechanism. Further, the fastening bolt for fastening the variable nozzle mechanism is safe from being loose or damaged. The unique structure of the present invention can be applied to the whole turbocharger equipped with the turbine housing, the bearing housing and the nozzle mount.

The invention claimed is:

1. A variable geometry exhaust turbocharger, comprising:
    a turbine housing to which exhaust gas from an internal combustion engine is introduced;
    a turbine rotor which is arranged in the turbine housing and is rotated by the exhaust gas;
    a turbine shaft whose one end is inserted in the turbine housing and is attached to the turbine rotor;
    a bearing which supports the turbine shaft;
    a bearing housing which is connected to the turbine housing and houses the bearing; and a variable nozzle mechanism which is fixed to the bearing housing and adjusts a flow of the exhaust gas to the turbine rotor,
wherein the variable nozzle mechanism includes a nozzle, a nozzle mount which supports the nozzle, a lever plate which engages with the nozzle and a drive ring which engages with the lever plate,
the turbine housing is a double cylindrical structure having an inner cylindrical portion and an outer cylindrical portion,
a nozzle plate of an annular shape which comes in contact with a tip of the nozzle is provided in the inner cylindrical portion of the turbine housing,
a through-hole and a screw through-hole are respectively provided in the nozzle mount and the nozzle plate,
a sleeve member is arranged coaxially with the through-hole and the screw through-hole between the nozzle mount and the nozzle plate,
the nozzle mount and the nozzle plate are connected by a fastening bolt which is inserted in the through-hole, the sleeve member and the screw through-hole in this order,
the sleeve member is formed such that a portion which is in contact with the nozzle mount and the nozzle plate has a thickness greater than that of a middle portion, and
the nozzle plate has a rib formed on a surface of the nozzle plate on a downstream side of the turbocharger.

2. The variable geometry exhaust turbocharger according to claim 1,
wherein the sleeve member is formed into a flange shape at each end portion thereof such that said each end portion of the sleeve member becomes thinner toward an outer circumference of the end portion.

3. The variable geometry exhaust turbocharger according to claim 1,
wherein the sleeve member is made of a material which has a lower rigidity than the nozzle mount, the nozzle plate and the fastening bolt.

4. The variable geometry exhaust turbocharger according to claim 1,
wherein the sleeve member is made of a material which has a lower coefficient of linear thermal expansion than the fastening bolt.

5. The variable geometry exhaust turbocharger according to claim 1,
wherein the fastening bolt has a tip which protrudes through a surface of the nozzle plate, the tip of the fastening bolt being swaged.

6. The variable geometry exhaust turbocharger according to claim 1,
wherein the rib of the nozzle plate is formed along at least one of a circumferential direction of the nozzle plate and a radical direction of nozzle plate.

7. A variable geometry exhaust turbocharger, comprising:
a turbine housing to which exhaust gas from an internal combustion engine is introduced;
a turbine rotor which is arranged in the turbine housing and is rotated by the exhaust gas;
a turbine shaft whose one end is inserted in the turbine housing and is attached to the turbine rotor;
a bearing which supports the turbine shaft;
a bearing housing which is connected to the turbine housing and houses the bearing; and
a variable nozzle mechanism which is fixed to the bearing housing and adjusts a flow of the exhaust gas to the turbine rotor,
wherein the variable nozzle mechanism includes a nozzle, a nozzle mount which supports the nozzle, a lever plate which engages with the nozzle and a drive ring which engages with the lever plate,
the turbine housing is a double cylindrical structure having an inner cylindrical portion and an outer cylindrical portion,
a nozzle plate of a annular shape which comes in contact with a tip of the nozzle is provided in the inner cylindrical portion of the turbine housing,
a through-hole and a screw through-hole are respectively provided in the nozzle mount and the nozzle plate,
a sleeve member is arranged coaxially with the through-hole and the screw through-hole between the nozzle mount and the nozzle plate,
the nozzle mount and the nozzle plate are connected by a fastening bolt which is inserted in the through-hole, the sleeve member and the screw through-hole in this order,
the sleeve member is formed such that a portion which is in contact with the nozzle mount and the nozzle plate has a thickness greater than that of a middle portion, and
the sleeve member is made of a material which has a lower rigidity than the nozzle mount, the nozzle plate and the fastening bolt.

8. The variable geometry exhaust turbocharger according to claim 7,
wherein the sleeve member is formed into a flange shape at each end portion thereof such that said each end portion of the sleeve member becomes thinner toward an outer circumference of the end portion.

9. The variable geometry exhaust turbocharger according to claim 7,
wherein the sleeve member is made of a material which has a lower coefficient of linear thermal expansion than the fastening bolt.

10. The variable geometry exhaust turbocharger according to claim 7,
wherein the fastening bolt has a tip which protrudes through a surface of the nozzle plate, the tip of the fastening bolt being swaged.

11. The variable geometry exhaust turbocharger according to claim 7,
wherein the rib of the nozzle plate is formed along at least one of a circumferential direction of the nozzle plate and a radical direction of nozzle plate.

12. A variable geometry exhaust turbocharger, comprising:
a turbine housing to which exhaust gas from an internal combustion engine is introduced;
a turbine rotor which is arranged in the turbine housing and is rotated by the exhaust gas;
a turbine shaft whose one end is inserted in the turbine housing and is attached to the turbine rotor;
a bearing which supports the turbine shaft;
a bearing housing which is connected to the turbine housing and houses the bearing; and
a variable nozzle mechanism which is fixed to the bearing housing and adjusts a flow of the exhaust gas to the turbine rotor,
wherein the variable nozzle mechanism includes a nozzle, a nozzle mount which supports the nozzle, a lever plate which engages with the nozzle and a drive ring which engages with the lever plate,
the turbine housing is a double cylindrical structure having an inner cylindrical portion and an outer cylindrical portion,
a nozzle plate of an annular shape which comes in contact with a tip of the nozzle is provided in the inner cylindrical portion of the turbine housing, a through-hole and a screw through-hole are respectively provided in the nozzle mount and the nozzle plate, a sleeve member is arranged coaxially with the through-hole and the screw through-hole between the nozzle mount and the nozzle plate, the nozzle mount and the nozzle plate are connected by a fastening bolt which is inserted in the through-hole, the sleeve member and the screw through-hole in this order, the sleeve member is formed such that a portion which is in contact with the nozzle mount and the nozzle plate has a thickness greater than that of a middle portion, and the sleeve member is made of a material which has a lower coefficient of linear thermal expansion than the fastening bolt.

13. The variable geometry exhaust turbocharger according to claim 12, wherein the sleeve member is formed into a flange shape at each end portion thereof such that said each end portion of the sleeve member becomes thinner toward an outer circumference of the end portion.

14. The variable geometry exhaust turbocharger according to claim 12, wherein the fastening bolt has a tip which protrudes through a surface of the nozzle plate, the tip of the fastening bolt being swaged.

15. The variable geometry exhaust turbocharger according to claim 12, wherein the rib of the nozzle plate is formed along at least one of a circumferential direction of the nozzle plate and a radical direction of nozzle plate.

\* \* \* \* \*